United States Patent [19]

Fell et al.

[11] Patent Number: 5,642,865
[45] Date of Patent: Jul. 1, 1997

[54] ARRANGEMENT FOR VARYING THE TAPE TENSION IN A MAGNETIC-TAPE APPARATUS

[75] Inventors: Wolfgang Fell; Werner Maack, both of Seeheim, Germany

[73] Assignee: U.S. Philips Corporation, New York, N.Y.

[21] Appl. No.: 608,976

[22] Filed: Feb. 29, 1996

Related U.S. Application Data

[63] Continuation of Ser. No. 268,077, Jun. 22, 1994, abandoned.

[30] Foreign Application Priority Data

Jun. 30, 1993 [DE] Germany .................. 43 21 703.6

[51] Int. Cl.$^6$ .................................................. B65H 59/38
[52] U.S. Cl. .................. 242/334.6; 242/353; 242/413.5; 242/417.3
[58] Field of Search .................. 242/353, 413.3, 242/413.4, 413.5, 417.3, 334.6

[56] References Cited

U.S. PATENT DOCUMENTS

| | | | |
|---|---|---|---|
| 2,959,369 | 11/1960 | House | 242/334.6 |
| 2,985,396 | 5/1961 | Johnson | 242/334.6 |
| 3,244,954 | 4/1966 | Branco | 242/334.6 X |
| 3,497,158 | 2/1970 | Calaway | 242/413.5 X |
| 3,539,129 | 11/1970 | Schmidt | 242/334.6 |
| 4,080,635 | 3/1978 | Zahn et al. | 242/417.3 X |
| 4,434,954 | 3/1984 | Ryan | 242/417.3 |
| 5,311,382 | 5/1994 | Chino et al. | 242/354 |

FOREIGN PATENT DOCUMENTS

| | | |
|---|---|---|
| 1766285 | 3/1958 | Germany . |
| 2-246039 | 1/1990 | Japan . |

Primary Examiner—Daniel P. Stodola
Assistant Examiner—William A. Rivera
Attorney, Agent, or Firm—Brian J. Wieghaus

[57] ABSTRACT

An arrangement for varying the tape tension in a magnetic-tape apparatus includes a pivotably supported sensing lever (15) whose free end is pressed against the magnetic tape (14) under the influence of a spring (16) and, upon deflection from a neutral position (15'), is reset to its neutral position (15') by a control device (17, 18) through a variation of the tape tension. In order to enable the tape tension to be rapidly reduced for operation in the stand-by mode, an actuating mechanism (20) can be activated separately and includes a resilient actuating lever (22) which extends into the pivoting range of the sensing lever (15) upon activation of the actuating mechanism (20) and causes this sensing lever to be deflected in opposition to the force acting on the sensing lever (15).

21 Claims, 3 Drawing Sheets

ARRANGEMENT FOR VARYING THE TAPE TENSION IN A MAGNETIC-TAPE APPARATUS

This is a continuation of application Ser. No. 08/268,077, filed on Jun. 22, 1994, now abandoned.

BACKGROUND OF THE INVENTION

The invention relates to an arrangement for varying the tape tension in a magnetic-tape apparatus, comprising a pivotably supported sensing lever whose free end is pressed against the magnetic tape under the influence of a spring which acts upon the sensing lever and which sensing lever, upon a deflection from a neutral position, is reset to its neutral position by a control device by means of a variation of the tape tension.

In a known arrangement of the type defined in the opening paragraph the tape forces, on the one hand, and the force exerted on the sensing lever by the spring, on the other hand, are in equilibrium in the neutral position of the sensing lever. When this equilibrium is disturbed, for example by an increase in the spring force, the sensing lever will deflect. This deflection is detected by a position sensor and transmitted to a control device. The motor current for the winder is then increased to such an extent that the increased tape tension causes the sensing lever to resume its neutral position. Thus, control is effected so as to maintain an equilibrium between, on the one hand, the force acting on the end of the sensing lever and, on the other hand, the tape forces.

If the magnitude of the tape forces is to be changed, for example for operation in the play mode or the shuffle mode, the spring force has to be changed. This is effected in known manner in that the point of application of the spring on the sensing lever is transferred to another position. When the point of application of the spring is thus transferred the resulting deflection of the sensing lever out of its neutral position is cancelled by the control system, i.e. the sensing lever is reset to its neutral position by a correspondingly increased or reduced tape tension.

The change in tape tension, i.e. a reduction of the tape tension, is particularly important in a so-called "stand-by" mode of a magnetic-tape apparatus. In such a mode, the magnetic tape is not driven but the magnetic heads of the scanner rotate and are thus in contact with the same portion of the tape for a longer time. This may lead to considerable damage to the tape. Therefore, it is useful to reduce the tape tension in such a stand-by mode. In the above-mentioned known construction this is effected by transferring the point of application of the spring on the sensing lever by means of a lead screw and a self-locking gear-wheel. Since it is not possible to predict when the stop command for the magnetic tape will be followed by a subsequent command for another mode of operation the lead screw has to be actuated very frequently and often unnecessarily if the next command occurs after a very short time. This means an increased wear. Moreover, the starting time for the next command increases because the lead screw should first transfer the spring end to another position.

DE-GM 17 66 285 describes a deck for magnetic-tape apparatuses comprising a sensing-lever arrangement for maintaining the tension of the magnetic tape constant. Therein, sensing levers which engage with the circumference of a sound-carrier spool are coupled to an actuating element for control devices for winding motors. This arrangement has been constructed in such a manner that the sensing levers are interconnected by a lever system by which they are jointly pivotable into their operating position or into a rest position upon actuation of a mode selection switch, if desired by relay control. Thus, the sensing levers are operative only in the "recording" or the "playback" mode. This reduces magnetic tape wear and simplifies mounting of the reel hubs.

A similar construction, which also serves to reduce the tape tension when the magnetic tape is stationary, is known from JP-2-246039. It comprises a pivotable lever which is spring-loaded and whose free end engages with the magnetic tape. The tape tension can then be changed by means of a first or a second sensor.

SUMMARY OF THE INVENTION

It is an object of the invention to construct an arrangement of the type defined in the opening paragraph in such a manner that the tape tension can be reduced very rapidly for the stand-by mode and that the previous situation can also be restored rapidly.

According to the invention, this object is achieved in that there has been provided an actuating mechanism which can be activated separately and which comprises a resilient actuating lever which extends into the pivoting range of the sensing lever upon activation of the actuating mechanism and causes said sensing lever to be deflected in opposition to the force acting on the sensing lever. As a result of this, the sensing lever is moved out of its neutral position, so that the control device which is thus activated reduces the current in the winding motor. This reduces the tape forces, so that the sensing lever can return to its neutral position. When the actuating mechanism is deactivated the actuating lever recedes so far that it is no longer within the pivoting range of the sensing lever.

Such an actuating mechanism is independent of the actuating mechanism for the spring which acts on the sensing lever and can therefore be actuated and incorporated independently thereof. Thus, the idea underlying the invention is that in the neutral-position range an additional spring in the form of the resilient actuating lever is applied to the sensing lever in a minimal time.

In an embodiment of the invention this resilient actuating lever, which is for example pivotable, is movable by the plunger of a plunger-type solenoid.

In another embodiment the resilient actuating lever is movable by the rotary member of a rotary-type solenoid.

Preferably, the force exerted by the resilient actuating lever is substantially equal to half the force acting on the sensing lever.

In a further embodiment of the invention the actuating lever is constructed to be inherently resilient, for example as a spring wire. This results in a very simple construction. However, alternatively, the actuating lever can be constructed as a rigid member provided with a resilient element.

Exemplary embodiments of the invention are shown diagrammatically in the drawings.

DETAILED DESCRIPTION OF THE PREFERRED EMBODIMENTS

Figure 1:
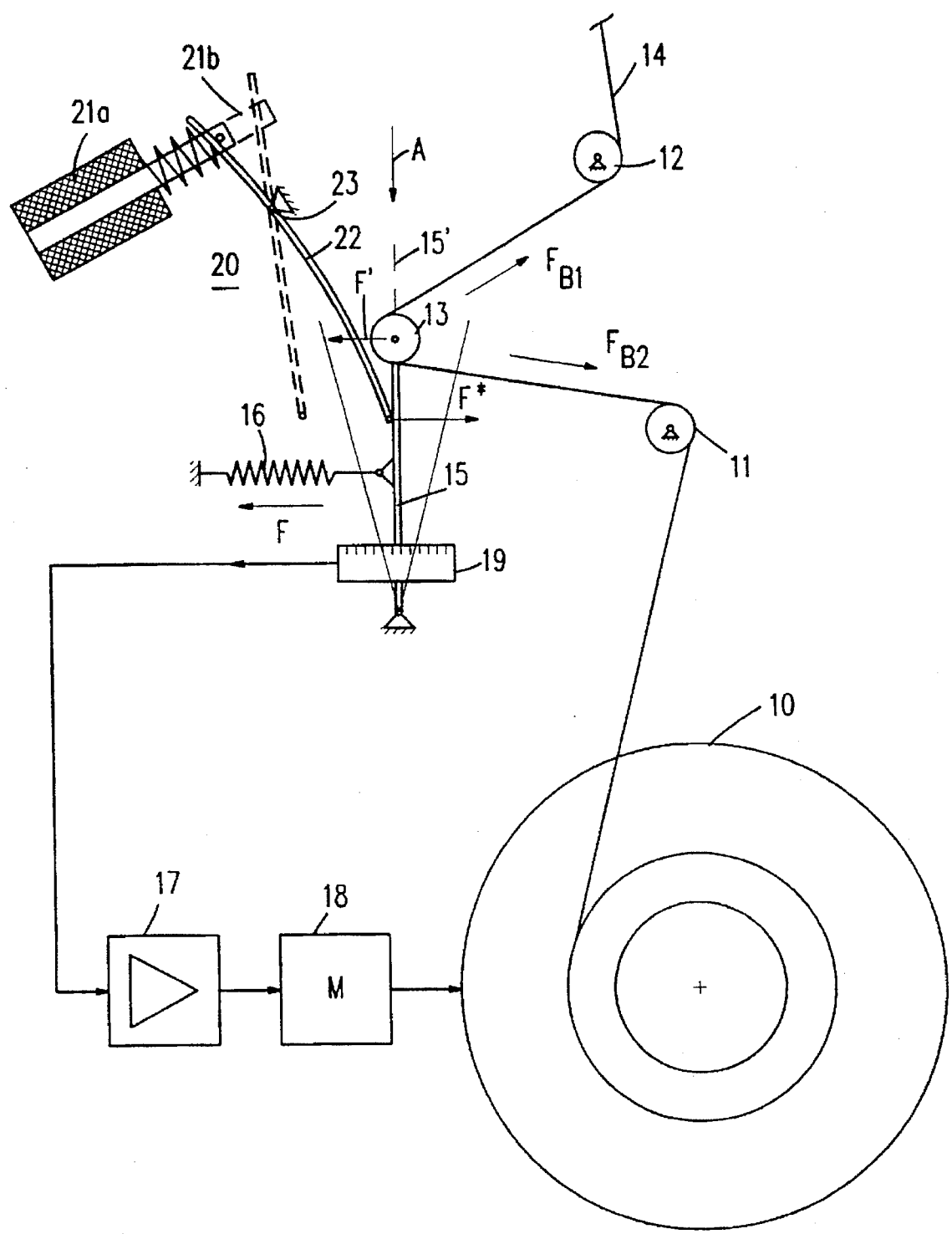
FIG. 1 shows a take-up reel of a magnetic-tape apparatus with a part of the tape-guide means at the location of a sensing lever for tape tension control.

FIG. 1 shows a take-up reel 10 of a magnetic-tape apparatus, which is not shown for the remainder, with a magnetic tape 14 guided by two stationary rollers 11, 12 and one movable roller 13. The movable roller 13 is mounted on the free end of a pivotably supported sensing lever 15, which is acted upon by a first biasing means in the form of a tension spring 16 which is fixed at one end. The spring 16 tends to pull the sensing lever 15 with a force F out of its neutral position 15' shown in FIG. 1. The force F' produced at the movable roller 13 counteracts the two tape forces $F_{B1}$ and $F_{B2}$ exerted by the magnetic tape 14. The numeral 17 refers to an amplifier and the numeral 18 to a motor of a control device. Control is effected in such a manner that a condition of equilibrium is maintained between the spring force F and the tape forces $F_{B1}$ and $F_{B2}$. When the sensing lever 15 is moved out of its neutral position as a result of, for example, an increased spring force F this is signalled by a position sensor 19 of the control device which, via the amplifier 17, causes the motor current to increase to such an extent that the tape tension forces $F_{B1}$ and $F_{B2}$ are increased via the take-up reel 10 and the sensing lever 15 is thus pulled back into its neutral position 15'.

The numeral 20 refers to an additional actuating mechanism comprising a solenoid coil 21a with a plunger 21b and a resilient actuating lever 22, which is pivotably supported at 23. The plunger and solenoid serves as a second biasing device which acts on and pivots the actuating lever 22 against the sensing lever 15. This actuating mechanism 20 can be activated very rapidly regardless of the mode of operation of the magnetic-tape apparatus. For example, in the standby mode when the magnetic tape 14 is stopped but the magnetic heads of a scanner, not shown, continue to rotate this may cause damage to the magnetic tape 14. In order to preclude this, the tape tension can be reduced very rapidly and effectively by activating the actuating mechanism 20. This is achieved, for example in the stand-by mode, in that upon energisation of the solenoid 21a, 21b the resilient actuating lever 22 is moved into the pivoting range of the sensing lever 15 and causes this lever to be deflected in opposition to the force F of the spring 16. As a result, the sensing lever 15 is moved out of the neutral position 15' to the right in FIG. 1, so that the position sensor 19 supplies a signal to the control device to reduce the current in the motor 18. Consequently, the tape forces $F_{B1}$ and $F_{B2}$ are reduced, thus enabling the sensing lever 15 to resume its neutral position 15'.

When the actuating device 20 is deactivated the actuating lever 22 moves into the broken-line position, i.e. so far that it is no longer situated within the pivoting range of the sensing lever 15.

Figure 2:
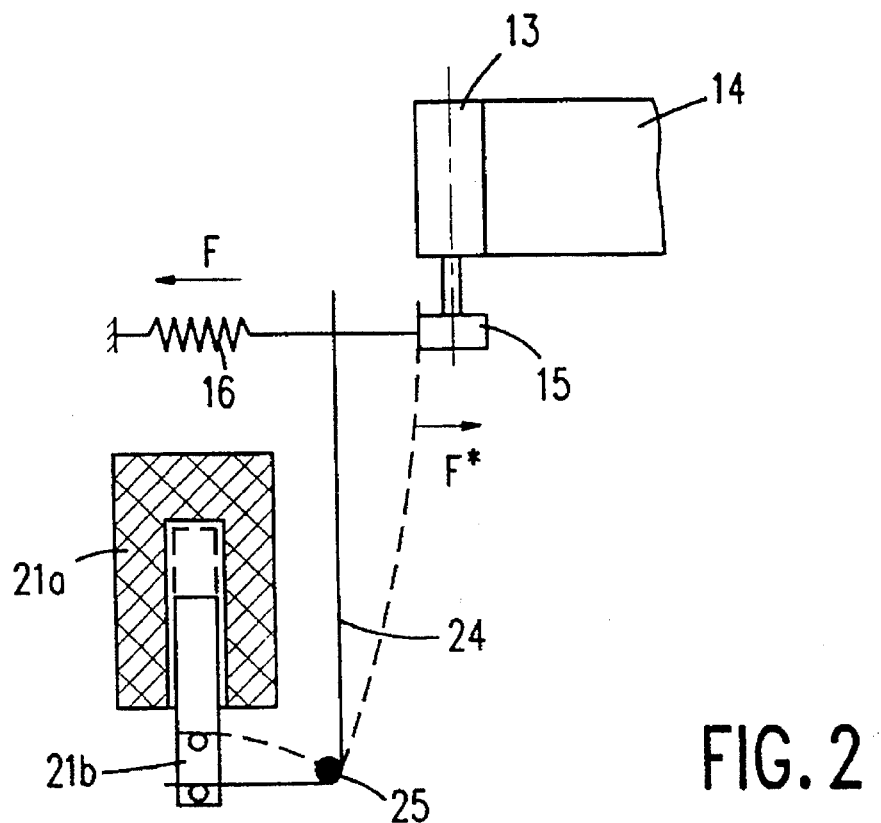
FIG. 2 shows a separate solenoid drive for the actuation of an actuating lever.

FIG. 2 shows the guide roller 13 in a view taken in the direction A in FIG. 1, the solenoid 21a, 21b being disposed in a position rotated through 90°. The actuating lever is now an angular lever 24, which is pivotably supported at 25.

Figure 3:
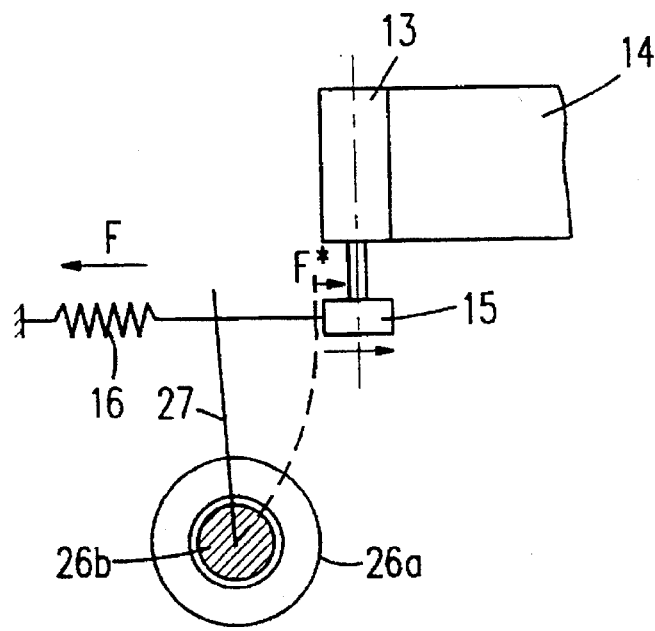
FIG. 3 shows another solenoid drive for the actuation of the actuating lever.

FIG. 3 is another embodiment viewed along the direction A in FIG. 1 and showing a solenoid coil 26a and an actuating lever 27 secured to a rotary member 26b.

F* indicates the force exerted on the sensing lever 15 by each lever 22, 24 or 27.

Figure 4:
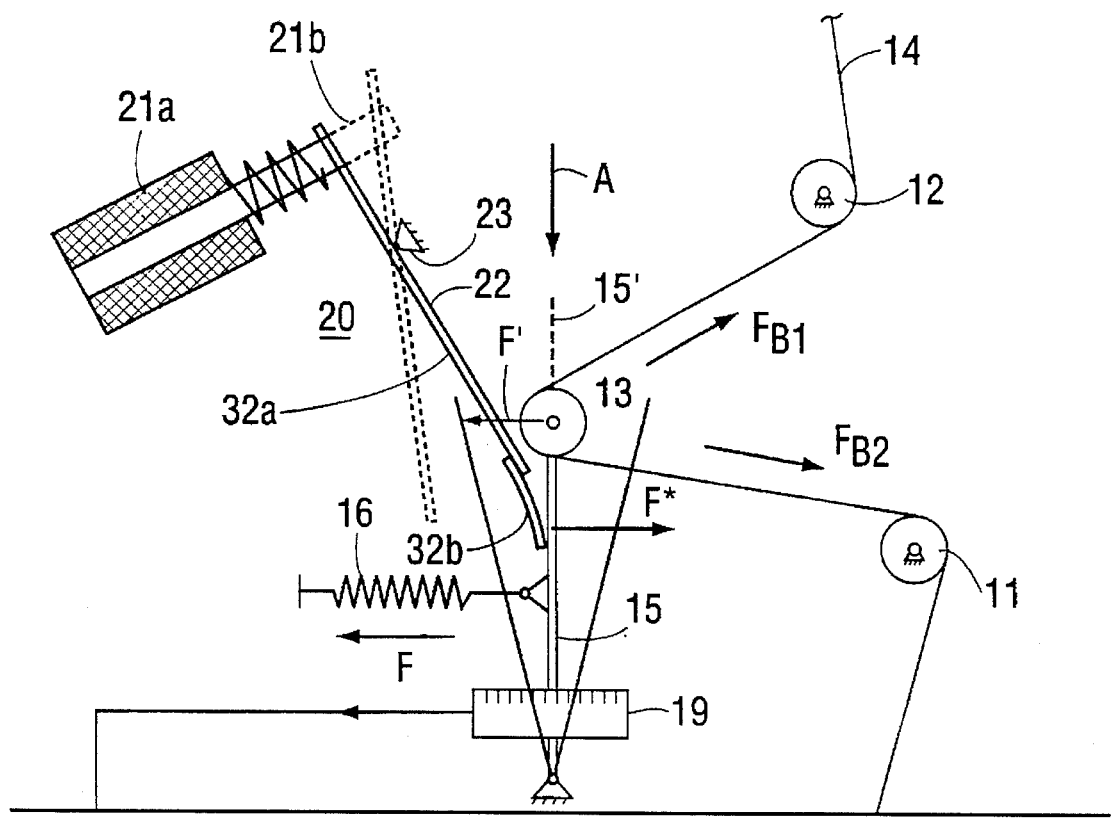
FIG. 4 shows another embodiment of the actuating lever which includes a rigid member and a resilient element.

FIG. 4 shows a portion of FIG. 1, in which the actuating lever 22 of FIG. 1 is replaced by an actuating lever 32 having a rigid member 32a and a resilient element 32b connected thereto.

We claim:

1. An arrangement for varying the tape tension in a tape apparatus, comprising:
    a pivotably supported sensing lever having a tape engaging portion pivotable from a neutral position through a pivoting range;
    biasing means for biasing said tape engaging portion of said sensing lever against the tape with a biasing force (F), the tape tension acting on said sensing lever in a direction opposite said biasing force (F) whereby the position of said sensing lever within said pivoting range varies with the tape tension;
    a control device comprising sensing means for sensing the position of said sensing lever within said pivoting range and tape tension control means coupled to said sensing means for controlling the tape tension to return said sensing lever to said neutral position; and
    an actuating mechanism, separately activateable from said biasing means, and comprising a resilient pivotable actuating lever which extends into the pivoting range of the sensing lever upon activation of the actuating mechanism and causes said sensing lever to be deflected in opposition to the biasing force (F) acting on the sensing lever by said biasing means.

2. An arrangement as claimed in claim 1, wherein said actuating mechanism further comprises a plunger connected to said actuating lever for moving said actuating lever.

3. An arrangement as claimed in claim 2, wherein a said actuating lever exerts a force (F*) on the sensing lever opposed to the biasing force (F) and substantially equal to half the biasing force (F) acting on the sensing lever.

4. An arrangement as claimed in claim 3, wherein the actuating lever is resilient.

5. An arrangement as claimed in claim 3, wherein the actuating lever includes a rigid member and a resilient element fixed to said rigid member.

6. An arrangement as claimed in claim 2, wherein the actuating lever is resilient.

7. An arrangement as claimed in claim 2, wherein the actuating lever includes a rigid member and a resilient element fixed to said rigid member.

8. An arrangement as claimed in claim 1, wherein said actuating mechanism further comprises a rotary solenoid with a rotary member connected to said actuating lever for moving the actuating lever.

9. An arrangement as claimed in claim 8, characterised in that said actuating lever exerts a force (F*) in the direction opposing the biasing force (F) and substantially equal to half the biasing force (F) acting on the sensing lever.

10. An arrangement as claimed in claim 9, characterized in that the actuating lever is constructed to be resilient.

11. An arrangement as claimed in claim 9, characterized in that the actuating lever includes a rigid member and a resilient element connected to said rigid member.

12. An arrangement as claimed in claim 8, wherein the actuating lever is resilient.

13. An arrangement as claimed in claim 8, wherein the actuating lever includes a rigid member and a resilient element fixed to said rigid member.

14. An arrangement as claimed in claims 1, wherein said actuating lever exerts a force (F*) on the sensing lever opposed to the biasing force (F) and substantially equal to half the biasing force (F) acting on the sensing lever.

15. An arrangement as claimed in claim 14, wherein the actuating lever is resilient.

16. An arrangement as claimed in claim 14, wherein the actuating lever includes a rigid member and a resilient element fixed to said rigid member.

17. An arrangement as claimed in claim 1, wherein the actuating lever is resilient.

18. An arrangement as claimed in claim 1, wherein the actuating lever includes a rigid member and a resilient element fixed to said rigid member.

19. A magnetic tape apparatus, comprising:

a) a rotatable take-up reel for a length of magnetic tape;

b) a tape tension sensing device including a pivotably supported sensing lever having a portion biased against the magnetic tape in a first direction and first biasing means for biasing said portion against the tape in the first direction, the tape tension acting on said sensing lever in a second direction opposite to the first biasing means and said sensing lever having a neutral position determined by said first biasing means and corresponding to a first tape tension, said sensing lever being moveable out of the neutral position over a range of movement of the sensing lever with variation in the tape tension from the first tape tension;

c) a control device including a motor driving the take-up reel, a position sensor sensing the position of said sensing lever, and control means coupled to said position sensor for controlling said motor to control the tape tension to return said sensing lever to said neutral position; and d) an actuating mechanism comprising a pivotable actuating lever pivotable from a first position outside the range of movement of the sensing lever to a second position against said sensing lever and second biasing means for pivoting said actuating lever from said first position to said second position against said sensing lever, in said second position said actuating lever exerting a second biasing force against said sensing lever so that the tape tension at which the sensing lever is kept in the neutral position by said control device is different from said first tape tension, and e) said second biasing means being actuatable separately from said first biasing means.

20. A magnetic tape apparatus according to claim 19, wherein said actuating lever acts against said sensing lever in a direction opposite to said first biasing means.

21. A magnetic tape apparatus according to claim 19, wherein said actuating lever includes a resilient portion and said second biasing means includes an actuator for moving said actuating lever between said first and second positions.

* * * * *